Oct. 28, 1930.    G. SIMMONS    1,779,513
COMBUSTION CONTROL
Filed Sept. 11, 1924    4 Sheets-Sheet 1

Inventor:
Gordon Simmons
By Henry H. Snelling
Attorneys

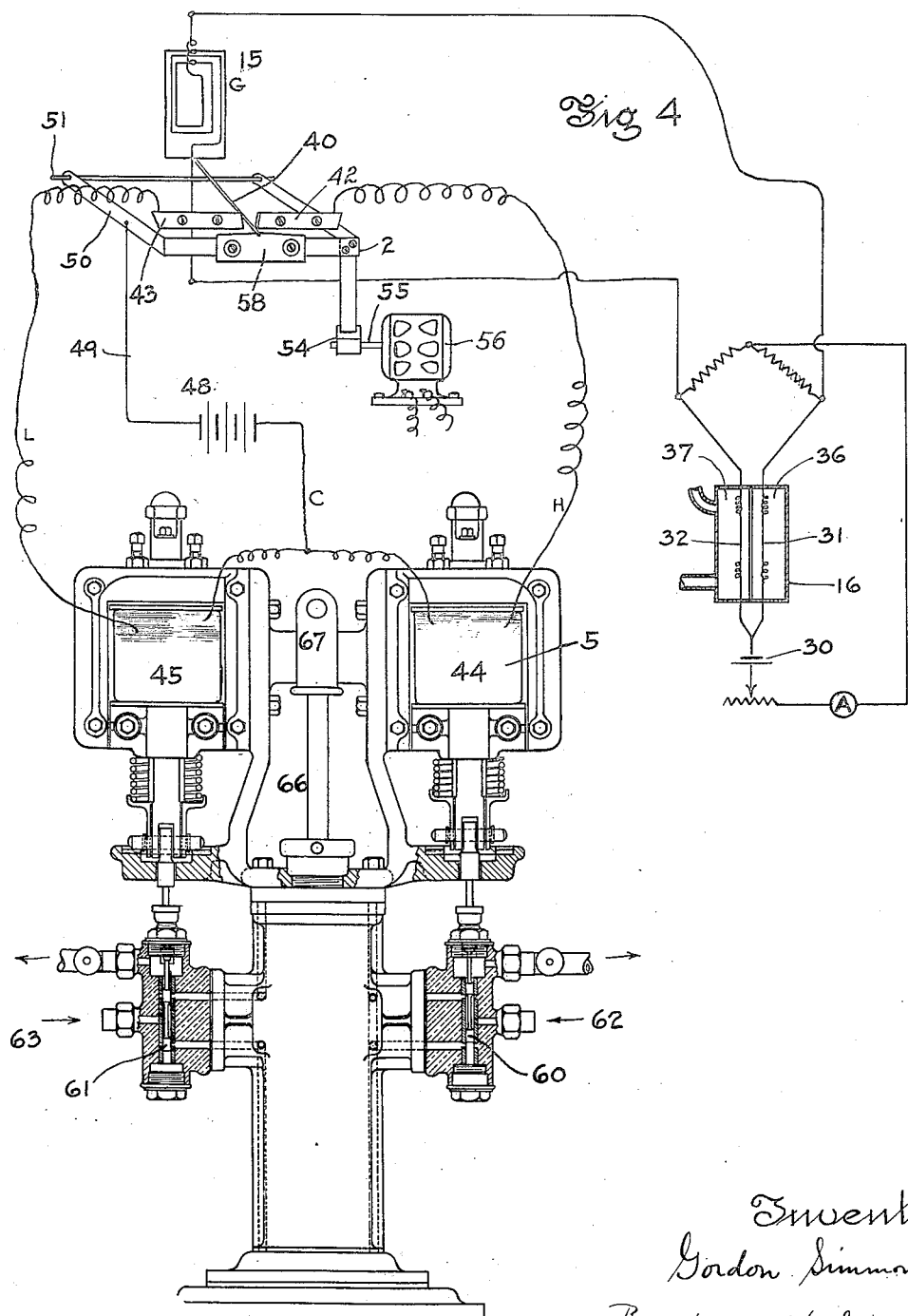

Patented Oct. 28, 1930

1,779,513

UNITED STATES PATENT OFFICE

GORDON SIMMONS, OF BALTIMORE, MARYLAND

COMBUSTION CONTROL

Application filed September 11, 1924. Serial No. 737,106.

This invention relates to combustion control and has for its object the provision of an apparatus including a device for governing the rate of supply of air and fuel in such a manner as to maintain constant the supply of air and fuel under any desired condition or proportion, while maintaining either at its highest efficiency or at some fixed value.

Other objects of the invention will be apparent from the description following and are particularly set forth in the various claims following such description.

My invention has to do with control systems and more particularly the control of a furnace operation. For extreme simplicity I have shown my invention as applied to a power plant layout, but I wish it distinctly understood from the start that the invention is not limited in any way to furnace work, although this is its preferred use.

In the drawings

Figure 4 is a schematic and partly sectional view showing the connections between electrical, chemical and analyzing apparatus, and the solenoid operated valve.

Figure 1:
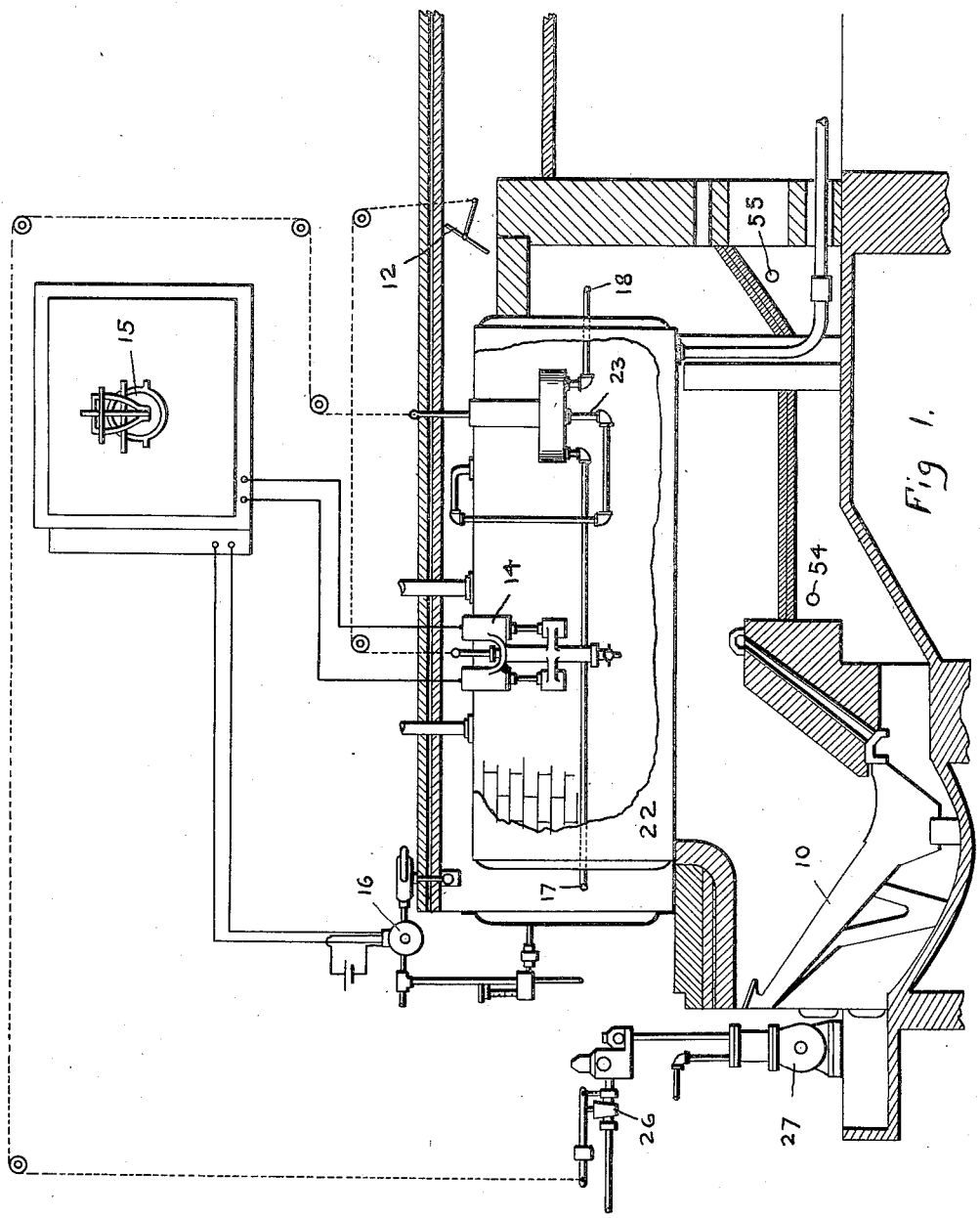
Figure 1 is a diagrammatic layout showing the various elements being governed and to be governed, and serves as a diagram to connect the remaining figures each of which indicate specific details.

In the drawings, 10 represents the grate of a furnace having a boiler up-take damper 12, controlled by the apparatus indicated by 14 of Figure 1 and shown in detail in Figure 4, the device 14 being controlled by the galvanometer 15 which in turn is operated by the hot wire indicator of a Shakespear cell 16 which determines the relative strength of the carbon dioxide in the gases, and consequently determines the relative temperature at some definite point in the combustion chamber, this being well known according to chemical and combustion engineering.

A differential pressure is obtained by pipes 17 and 18, located at any portion or place in the gas passage provided of course that no varying factor is placed between them, as for example the coal bed. These pipes 17 and 18 lead to the device illustrated in its preferred form in Figure 3 and in its more ordinary form in Figure 2. The steam pressure in the boiler 22 is conveyed through a pipe 23 to the float tank in order to add a differential which will alter the pressure on one side of the float tank, and because of such arrangement variations in the steam pressure will affect the differential pressure of the furnace gases and will add a still further and quite necessary correction to the mechanism connecting the device of Figure 4 with the steam valve 26 of the stoker engine 27, the latter controlling in well known and ordinary manner the speed of supply of fuel to the fire.

Figure 2:
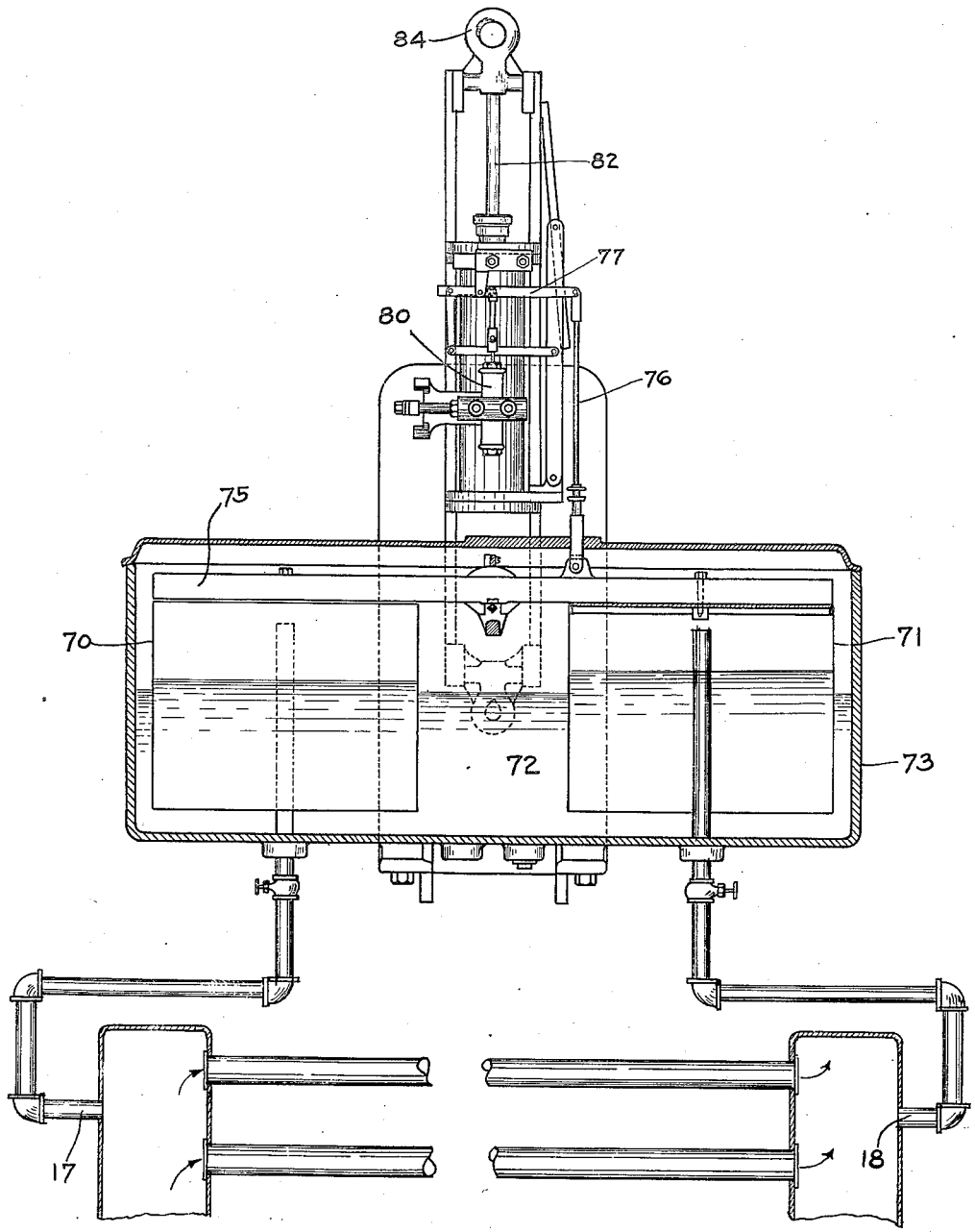
Figure 2 shows a fairly well known type of regulator operating by differential pressures to raise and lower a plunger.
Figure 3:
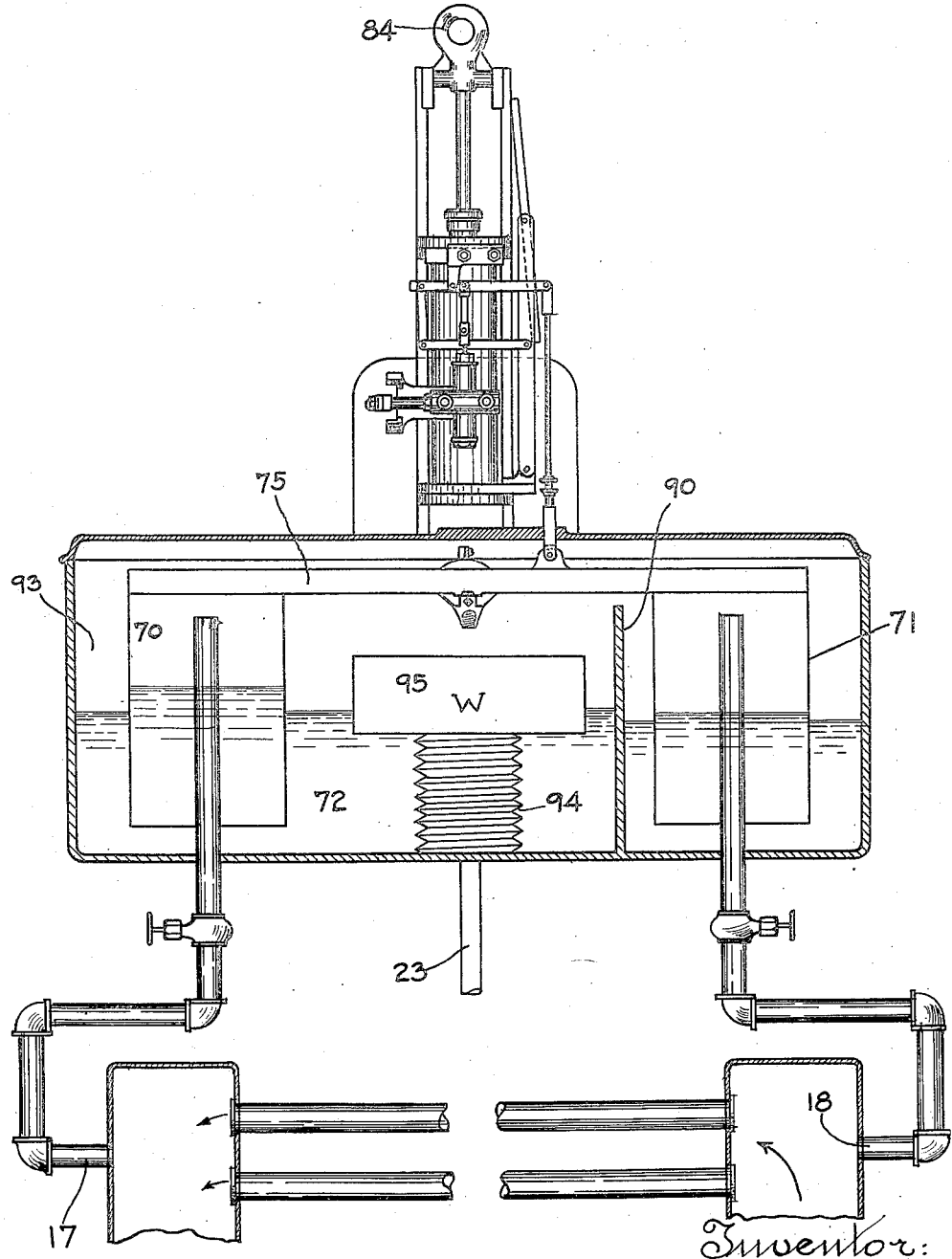
Figure 3 shows a similar regulator but in which I have altered the main flow tank in order to add an additional element to counteract or increase the effect of pressure on one side of the system.

The Hagan regulator shown in Figure 2 is entirely old when used to govern the position of either the valve for the blower engine for the air, the air in-take damper or the boiler up-take damper. It is novel with me, however, to add a variable to the differential pressure operating mechanism for a valve of any kind, and I desire to cover broadly the combination shown in Figure 3 wherein the height of the liquid is raised and lowered in one side of the float tank by means of a displacement mechanism operated directly by the steam pressure in the boiler.

Considering Figure 4 in detail, 30 is a source of electrical current conveyed through two extremely fine platinum wires 31 and 32 to the two sides of the galvanometer 15 which is bridged in the usual manner to the other side of the source of power 30, here diagrammatically indicated as a battery. This device is not well known, perhaps, but at least is old and I make no claim whatsoever to it per se. The wires 31 and 32 are each mounted centrally of bores 36 and 37 in a block 16 and the wires are heated through the electric source 30 and the galvanometer measures relative resistances in the two sides or bores, through one of which, as for example 37, the furnace gases are passed and through the other of which air is passed, the air and the gases of course being heated or cooled so that they are of the same temperature.

If there is no carbon dioxide in the furnace gases, the galvanometer which has previously been calibrated, will indicate 0, but as the strength of the carbon dioxide increases the galvanometer will show a proportionate deflection, this deflection, in addition to the usual indicator needle, being carried to a rod 40 of conducting material and mounted to swing under plates 42 and 43, electrically connected respectively to the solenoids 44 and 45, having their common return through the source of electric power 48, connected by the wire 49 to an oscillating bracket 50 pivoted as at 51 and receiving its oscillating movement through any sort of mechanism desired, for example a crank 54 carried on the armature shaft 55 of the motor 56, the angle of oscillation being such as to cause the electric conducting plate 58 to pinch the rod 40 between contact 42 or the contact 43, in case the galvanometer has deflected the rod 40 in either direction. If the galvanometer reading is substantially normal the oscillation of the bracket 50 will not cause current to be transmitted to either solenoid as the rod 40 will ride in the space between the two similar contacts 42 and 43.

Should the carbon dioxide content of the furnace gases become less than the desired value or greater than such value the galvanometer will swing from its central position (which is not 0 of course but is the desired constantly maintained per cent carbon dioxide) and current will be supplied to one of the solenoids 44 or 45 which will in the customary manner draw up its armature operating the little piloting valve 60 or 61 as the case may be and will draw water or other fluid through the pipe 62 or 63 to one end of the hydraulic plunger operating the piston rod 66 carrying a cap 67, the latter connected as shown in Figure 1 to the boiler up-take damper 12, or to the blast gate, not shown.

Referring now to Figure 2, the pipes 17 and 18 are connected to the space within the hydraulic bells 70 and 71, immersed open end downward in the liquid 72 within the float tank 73. Variations of the pressure in the pipe 17, for example, will cause the water in the bell to raise or lower causing a consequent lowering or raising of the arm 75, which movement through the link 76, lever 77 and connected mechanism operating the valve 60, controls movement of the piston, the rod 82 of which is shown at the top of the figure and carries the customary eye 84 which, in the embodiment shown in Figure 1 is connected to the steam valve 26 of the stoker engine 27.

The pressure in the pipe 17 and 18 which, as stated, may be located anywhere within the gas space, together indicate differential pressures and consequently indicate or are responsive to changes in the rate of flow of the gases, or the air if both pipes are located in the air passage as indicated at 54 and 55. This differential pressure, by the device shown in Figure 2, controls the rate of supply of the fuel in a very definite ratio to the rate of flow of the air or of the gas, since the eye 84, as stated, is connected to the balanced steam valve 26, which controls the speed of the stoker engine.

While the Hagan regulator shown in Figure 2 is quite satisfactory for the purpose set forth, I find that a considerably higher relative degree of efficiency may be obtained by varying the effective pressure on one side of the system, the pipe 17 for example. Instead of having the kerosene or other liquid filling the entire tank 73 in one mass as in Figure 2, I divide the float tank by a partition 90 of sufficiently low height to clear the arm 75 and within the larger portion 93 of the float tank chamber I mount a corrugated metal cylinder 94 carrying at its top a weight 95 of such size as to cause an appreciable displacement of the fluid 72 in the larger portion 93 of the float tank. Obviously, increased steam pressure will expand the metal cylinder 94, raising the weight 95 and lowering the level of the liquid in the larger portion of the tank, while decreasing the steam pressure allows the weight 95 to sink and thereby raises the liquid level causing the bell 70 to rise, even though the pressure in the pipe 17 should remain constant, Thus it will be seen that if, while the differential pressure is constant, the steam pressure in the boiler fluctuates, the position of the balanced steam valve controlling the stoker engine speed will be altered by a raising or lowering of the eye 84 and conversely if, while the steam pressure is constant the differential pressures alter, the rate of supply of the fuel will be controlled by the changes in differential pressure. From this it is quite evident that if both the steam pressure and the differential pressure in the gas conduit simultaneously change, they may work together to increase or diminish the speed of the stoker engine, or if they are in opposite directions the effect of one will exactly counteract the effect of the other and the stoker engine may continue to run at constant speed in spite of the simultaneous change in both the differential pressure and the steam pressure in the boiler.

As far as I know, no attempt has ever been made simultaneously to control the air or any other element entering into a combustion cycle by temperature and controlling fuel, air or any other element of combustion by a differential pressure in the air or gas circuits.

My invention goes still further. It controls the air in a definite and predetermined ratio to the carbon dioxide content and simultaneously controls the supply of fuel in a definite and predetermined ratio to the differential air pressure in the air or gas system, and I may utilize the apparatus of Figures 3 and 4 in the method set forth in the foregoing description, while simultaneously using the Hagan regulator of Figure 2, connected to communicate with the furnace chamber on one side and with atmosphere on the other side, to control another element of the system, for example, the blast gate (which gate however, may more simply be hand controlled) in case the device of Figure 4 is attached as shown in Figure 1 to the boiler uptake damper as shown.

The system set forth will perhaps have its greatest field of usefulness in connection with a combustion system but this does not necessarily apply to combustion of coal. I may, for example, apply the system to a plant in which sulfur is burned to produce sulfur dioxide for the making of sulfuric acid. In this case, instead of passing the carbon dioxide through the bore 36 I would pass the sulfur dioxide and would, of course, calibrate the galvanometer 33 to indicate and to move the rod 40 in accordance with the sulfur dioxide content. I might, for example, desire to mantain the sulfur dioxide content of the combusting furnace at a value of say eight per cent sulfur dioxide. Obviously, this would require a definite temperature T° at some given point.

In the system a variation in the temperature would move the galvanometer and this in turn would through the mechanism shown in Figure 4 open and close the damper which would be governing the air supply exactly the same as in the boiler feed arrangement illustrated, and by changing this air supply I would govern the percentage of sulfur dioxide in the gases. Similarly, the regulator shown in Figures 2 and 3 would be used in the same system and would again control the supply of fuel but in this case the fuel would be the sulfur. As the differential pressure is altered the rate of flow of the sulfur dioxide carrying gases would also be altered, in fact being the cause of change in differential pressure, and in order to keep the production at a fixed rate, the regulator whether as in Figure 2 or in Figure 3, preferably the former, however, would control the rate of supply of the sulfur which would have absolutely no effect on the percentage of sulfur dioxide in the product because this would be governed irrespective of the rate of supply of the sulfur by the solenoid controlled air damper.

While I have shown only one form and have described only one other form of apparatus to which my device can be applied, I claim for it the entire field of usefulness set forth in the claims and do not wish the invention considered limited to a combustion reaction as I wish the invention considered as broadly as specified in the claims.

The operation of the device as shown in Figure 1 is as follows: The steam pressure from the boiler is directly connected to the corrugated cylinder 94 thru pipe 23; the differential pressure in the gas passage in conjunction with the steam pressure operates the arm 75 of Figure 2 or of Figure 3 and this controls the admission of steam to the stoker engine 27; a sample of the flue gas is taken from the last pass and operates the Shakespear $CO_2$ cell 16 and this actuates the galvanometer device which operates the mechanism 14 controlling the position of the up-take damper 12 regulating the air supply.

We will now assume a considerable drop in the relative per cent of $CO_2$ present in the flue gases. The Wheatstone bridge in the Shakespear cell becomes unbalanced causing a deflection of the galvanometer 15 and this operates one of the solenoids of device 14, the plunger of which descends raising the weighted end of the damper lever, to close the damper 12 and decrease the air supply. It will be understood that these changes are very small and that the damper is only incrementally closed, at two minute intervals for example, until the $CO_2$ percentage is brought back to the predetermined standard set, at which time the galvanometer will have its rod in central position between the two contact arms. Similarly, if the $CO_2$ percentage should increase, the galvanometer will swing in the opposite direction, affecting the other solenoid, causing the plunger of device 14 to rise loosening the chain and allowing the weight on the arm of the damper 12 to open the damper and admit a greater quantity of air.

The fuel feed is controlled by the arm 75 which in turn is controlled by the steam pressure in the boiler and independently by the differential pressure in the flue gas (or air) passage. When this differential pressure drops the fuel feed is diminished, and when such pressure increases the speed of the stoker engine is increased by the opening of the balanced steam valve 26. In either event any change in steam pressure will affect the height of the liquid in the larger chamber of the tank 72, an increase in steam pressure tending to decrease the speed of the stoker engine and a decrease in steam pressure tending to increase the rate of supply of fuel to the bed. Any change, therefore, in steam pressure or in the differential pressure in the fuel gas passage will continue the increase or decrease in the rate of supply of fuel until such time as these pressures are brought back to normal.

What I claim is:

1. In a fuel combustion system, the combination with means for controlling the supply of air to the combustion chamber and means for supplying the fuel, of means governed by the relative proportion of one of the products of combustion to the total products of combustion for controlling the air supply means, and means governed by the rate of flow of the product of combustion for controlling the fuel supply means.

2. In combination, a furnace, a boiler heated thereby, automatic means for supplying fuel to said furnace, a device for controlling the supply of air to the furnace, means governed by continuous chemical analysis of the furnace gases for controlling the air supply device, means governed by differential pressures in the gas system for controlling the fuel supply device, and means governed by changes in the steam pressure for altering the effect of said means for controlling the fuel supply.

3. In combination, a furnace, a device for controlling the supply of air to the furnace, a device for controlling the amount of fuel fed to said furnace, an electrical mechanism responsive to changes in the carbon dioxide content of the stack gases, electrical connections between said responsive means and said first mentioned device, a syphon operated by steam pressure for modifying the action of the fuel feed control device.

4. In a steam generating furnace, a stoker, a boiler uptake damper, means governed by the $CO_2$ content of the flue gases for operating said damper, said means including a galvanometer operated by a Shakespear cell, a float tank mechanism controlling the operation of the stoker, and means for correcting the action of the float mechanism in accordance with the steam pressure.

5. In a steam generating furnace, a float tank, a pair of hydraulic bells, a pivoted arm connecting said bells, a partition separating the tank into two compartments, means for producing a differential pressure under the bells in accordance with a difference of pressure in the furnace passage, means governed by the steam pressure for altering the level in one compartment, and means connected to said pivoted arm for altering the rate of fuel fed to the furnace.

6. The device of claim 5 in which the last named means includes a weighted corrugated metal cylinder.

In testimony whereof I affix my signature.

GORDON SIMMONS.